June 8, 1954  E. E. DONNELLY, JR., ET AL  2,680,462
TUBELESS TIRE CASING
Filed Dec. 20, 1951
2 Sheets-Sheet 2
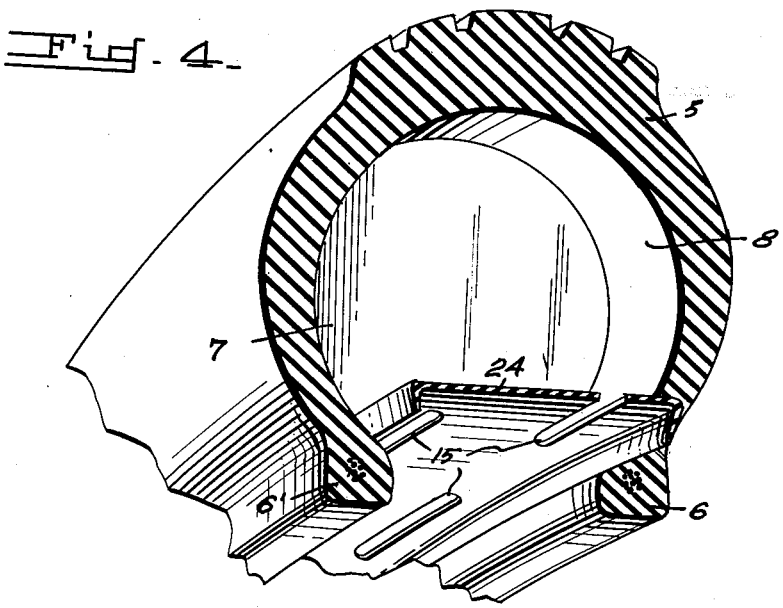
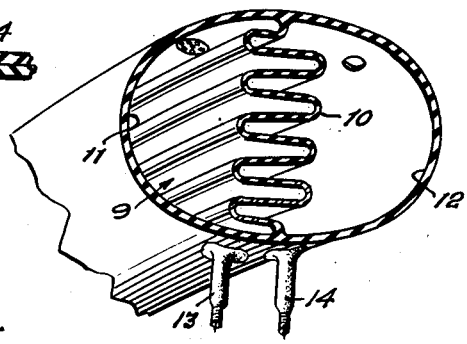
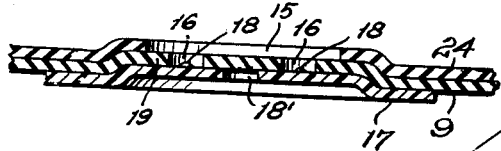
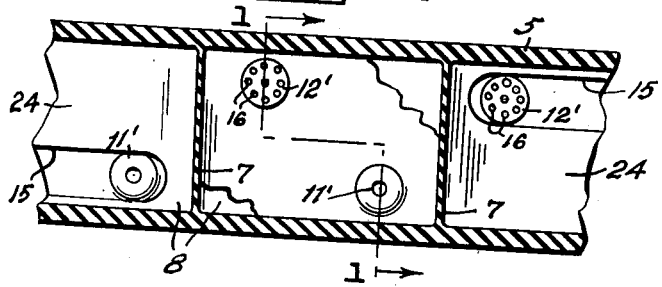
INVENTORS
Edwin E. Donnelly, Jr.
S. Joseph Rotondi Jr.
BY G. J. Kessenich, A. W. Dew
and S. J. Rotondi, Jr.
ATTORNEYS Patented June 8, 1954

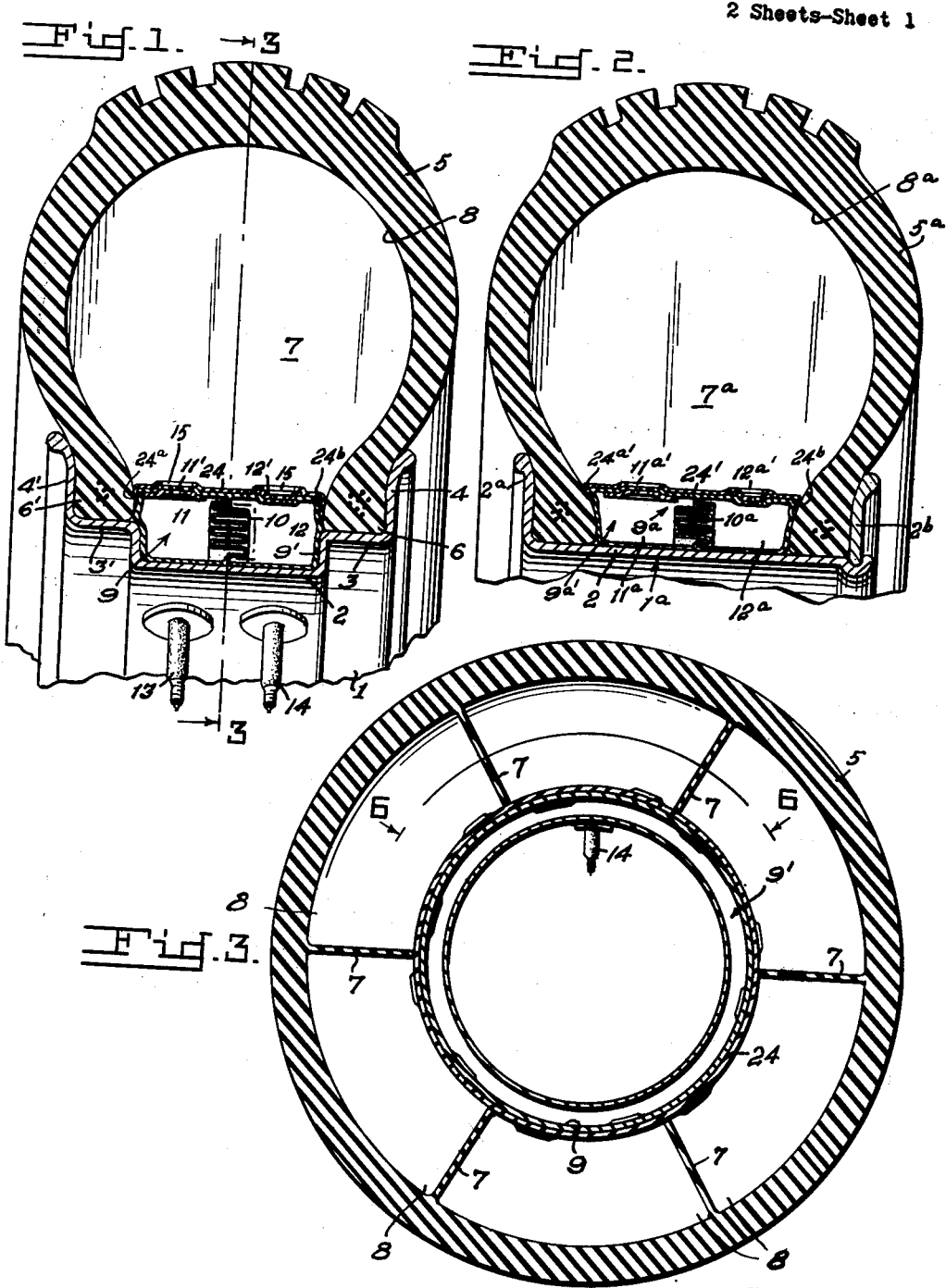
June 8, 1954 — E. E. DONNELLY, JR., ET AL — 2,680,462
TUBELESS TIRE CASING
Filed Dec. 20, 1951 — 2 Sheets-Sheet 1
INVENTORS:
Edwin E. Donnelly, Jr.
S. Joseph Rotondi, Jr.
BY G. J. Kessenich, A. W. Dew
and S. J. Rotondi, Jr.
ATTORNEYS.

2,680,462

UNITED STATES PATENT OFFICE 2,680,462

TUBELESS TIRE CASING

Edwin E. Donnelly, Jr., Arlington, and Salvatore Joseph Rotondi, Jr., Alexandria, Va.

Application December 20, 1951, Serial No. 262,642

6 Claims. (Cl. 152—338)

(Granted under Title 35, U. S. Code (1952), sec. 266)

The invention described in the specification and claims may be manufactured and used by or for the Government for governmental purposes without the payment to us of any royalty thereon.

The present invention relates to a tubeless pneumatic tire, and more particularly to a "puncture proof" tubeless pneumatic tire.

The danger occasioned by "blowouts" when a vehicle is traveling at a fairly rapid rate of speed is well known and rather widely prevalent. Buses, trucks and passenger vehicles have a tendency to swerve or turn over, either off the road, or into the path of oncoming traffic when a tire suddenly deflates as the result of a "blowout," thereby causing untold traffic accidents with the consequent loss of many lives, limbs, and resulting in numerous body injuries. Further, as any motorist or vehicle operator well knows, blowouts ofttimes occur at locations on the open road where it may be extremely difficult or even impossible at the time to remove the blowout tire and replace it with a spare tire. If a spare is not available for ready replacement other complications are introduced which would necessitate continued operation of the vehicle until a service station is reached. This obviously causes irreparable injury to the tire and considerable inconvenience to the vehicle operator.

Additionally, in military warfare, the desirability of maintaining in inflated condition the tires on supply trucks, staff cars, ambulances, vehicles for transporting personnel and weapons, etc. is obvious. In combat, tire repair and replacement may not always be possible or expedient, consequently a tire which would eliminate some of the inconveniences experienced due to deflation as the result of a sudden puncture by a shot, or from other causes, and which would enable the vehicle to continue in operation until repairs can be safely made, would appear to be of inestimable value.

It is accordingly an object of this invention to provide a "puncture proof" tire which remains inflated even although subjected to a "blowout."

It is also an object of this invention to provide a "puncture proof" tire which eliminates the use of an inner tube, and which remains inflated after a "blowout" to enable the vehicle operator to proceed to his destination, or to a location where replacement or repair of the tire can be more easily effected.

It is a further object of this invention to provide a tubeless pneumatic tire having a plurality of equiangularly disposed radial diaphragms to divide the tire into a plurality of arcuate compartments, and including means to inflate and deflate the tire for purposes of repair.

It is also a further object of this invention to provide a tubeless pneumatic tire having a plurality of equiangularly spaced radial diaphragms to divide the tire into a plurality of arcuate compartments, and including continuous annular conduits disposed in the tire adjacent the inner end of the radial diaphragms, and having valves for permitting the introduction, and removal of air from each of the compartments.

It is also a further and secondary object of this invention to provide a tubeless pneumatic tire wherein the inflating and deflating conduits are so disposed with respect to the tire and tire rim as to provide an effective air tight seal to prevent the escape of air from the tire regardless of whether the tire is mounted on a drop center rim or a demountable rim, and irrespective of any rough service to which the tire may be put.

With the foregoing general objects in view as well as more and other specific objects which will become manifest from a reading of the following specification, the invention consists in a certain novel construction and arrangement of elements more fully and particularly referred to and specified hereinafter.

Referring to the accompanying drawing which forms a part of the specification.

Figure 1 is a transverse section of a tubeless tire taken on line 1—1 of Figure 6, showing the tire mounted on a drop center rim and including the position of the inflating and deflating conduits.

Figure 2 is a modification showing a tubeless tire mounted on a demountable rim.

Figure 3 is a longitudinal section taken on line 3—3 of Figure 1.

Figure 4 is an isometric view of a tire showing how an insert may be used to abut the ends of the radial diaphragm before the inflating and deflating conduits are put in place.

Figure 5 is an isometric view of the inflating and deflating conduits, illustrating the distensible vertical wall.

Figure 6 is a plan view looking in the direction of arrows 6—6 of Figure 3 with a portion of liner removed.

Figure 7 is an enlarged view of the one way flap valve located in the outer wall of the inflating conduit.

In the modification illustrated in Figures 1, 3, 4, 5 and 6, reference character 1 represents a rim of the drop center type having a well 2, annular shoulders 3, 3' outwardly of well 2 and upstanding flanges 4, 4'. A tire 5 of conventional construction is mounted on rim 1 with the toes of tire ends or beads 6, 6' abutting shoulders 3, 3' and with the outer surface of the beads per se abutting flanges 4, 4' of the rim. The tire may, if desired, be provided with an impervious lining of rubber or rubber-like substance. Interiorly, the tire is provided with a plurality of equiangularly spaced radial diaphragms 7 dividing the casing into a plurality of arcuate compartments 8. The diaphragms 7 which are semi-flexible and of a composition such as natural or synthetic rubber may be joined to the inner surface of the tire in any well known manner, and are disposed in the casing to extend radially inwardly to a location which ends radially outwardly of the toes of beads 6, 6'. The inner ends of each diaphragm, in effect, are the outer radial limits of a toroidal space 9', the inner radial limitation of which is the felly portion of well 2 of the mounting rim, and in which is received a deformable annular conduit 9 of flexible rubber composition provided with a longitudinal partition 10 to form respectively contiguous conduits 11 and 12. Partition 10 is of flexible and deformable rubber composition and comprises a plurality of folds so as to be distensible for a purpose to be later described. Conduit 11 may be designated an air supply conduit and is provided in its upper wall with a plurality of one way flap valves 11', circumferentially spaced so that each valve lies between adjacent diaphragms 7 to permit the flow of air into the corresponding compartment 8. Similarly, conduit 12 is a deflecting conduit and is also provided with a plurality of one way flap valves 12', one for each of the segments 8 and opening in a direction opposite to valves 11' to permit the tire to be deflated. A preferred arrangement of inflating and deflating valves is illustrated in Figure 6, wherein the valves are staggered so as to communicate with diagonally opposite corners of each compartment 8. Supply conduit 11 and deflating conduit 12 are also provided, respectively with valves 13 and 14 extending through the felly of rim 1 and of the type commonly used in pneumatic tire tubes, to permit inflation and deflation of the tire as subsequently to be described. A comparatively rigid, rubberized fabric insert or liner 24, having inwardly and downwardly turned edges or flanges 24a and 24b, and having slots 15 in alinement with flap valves 11' and 12' may be disposed between the air inflating and deflating conduit and the diaphragms ends, and to extend laterally from one inner wall to the other of the tire for the purpose of providing a wearing surface in order to protect the air conduits when the tire bearing vehicle is in motion.

The type of flap valve with which the inflating and deflating conduits is preferably provided, is clearly seen, typically, in Figure 7. The valve is simple in construction, of extremely light weight, and easily formed for example, by perforating the upper surface of the air supply conduit with a plurality of holes 16 equally spaced circumfereintially. To the under surface of the conduit and co-axial with holes 16 is vulcanized or secured in any well known manner a comparatively rigid rubber or plastic dish shaped disc 17 having a thin circumferential lip or protuberance 18 on its upper surface of diameter approximately the same as the diameter of a circle through holes 16, such that the protuberance divides each hole substantially in half when in place. Disc 17 is provided with a central aperture 18', and the section 19 of conduit 11 encompassed by holes 16 forms a diaphragm to seal central aperture 18' when subjected to a pressure normal to section 19 and in a direction opposite to the side on which disc 17 is secured. Thus when air is admitted to the inflating conduit, center section 19 is forced away from the periphery of central aperture 18' to permit air to gain access to the separate arcuate sections of the tire by way of holes 16. The valves in the deflating conduit are similarly formed. However, the rigid disc is, instead, located on the upper surface of the conduit so that each valve, in direction, is oppositely actuated so that the compartments may be deflated.

In mounting the tubeless tire, the insert or liner 24 is first put into place with the flat surface abutting the ends of diaphragms 7, and with the turned down edges 24a and 24b contacting the inner wall of the tire beads. Sufficient air is then introduced into the deflating conduit 12 to permit conduit 9 to be handled more easily, after which conduit 9 is placed within the tire and tire is mounted on the rim, care being taken to aline valves 13 and 14 with the corresponding holes in the felly of the rim. Of course, the rim has been provided with two holes instead of the usual one so that both valves may be accommodated. The elongated slots in liner 24 facilitates alinement of the inflating and deflating valves therewith. Air is now introduced into the inflating conduit and by way of valves 11' into the compartments 8. Some of the air will also proceed into deflating conduit 12 by way of valves 12' until a balanced inflating condition is arrived at.

It is to be noted that when the tire is entirely inflated, conduit 9 will distend due to air pressure, and will deform, to assume the shape of compartment 9', and will also tightly press against the well 2 of the rim, against liner 24 and against the wall of the tire, thus effecting an air tight seal to prevent the escape of air.

In operation, assuming a puncture or leak in one of the compartments 8, air will escape from this compartment and from the inflating conduit, however the deflating conduit will remain filled with air and will cause partition 10 to distend assisted by the additional movement of air under pressure through valves 12' into conduit 12. Since the pressure in conduit 12 is considerably less than the pressure in each of the remaining inflated compartments 8, partition 10 will distend and deform to an extent to conform to the original contour of conduit 9, to thereby retain effective the air tight seal between the tire and rim. Although the tire is now "softer" than it was originally because of the air lost through the puncture, it still remains inflated sufficiently to permit smooth motion of the vehicle.

In the modification of Figure 2, reference character 1a represents a demountable rim having a felly 2, an integral upstanding flange 2a and a removable upstanding flange 2b which is removably bolted (not shown) to the tire rim in the well known manner. The tire 5a is provided with equiangularly spaced radial diaphragms 7a similarly as in Figure 1 to form compartments 8a. The tire may, if desired, be provided with an impervious thin layer of rubber or rubber-like composition. A rubberized fabric liner 24', having downwardly turned edges 24a' and 24b' is placed in the tire with the flat portion in abutting relation with the ends of diaphragms 7a, liner 24' forming with rim 1a, a toroidal chamber 9a' to receive conduit 9a which is divided by a longitudinal wall 10a to form inflating conduits 11a and 12a respectively. The upper surface of conduit 11a is provided with inwardly opening one way flap valves 11a', and conduit 12a is provided with outwardly opening one way flap valves 12a', similarly as in Figure 1, each compartment 8a being in communication with the inflating and deflating conduits by way of one inflating flap valve and one deflating flap valve. Conduit 11a is provided with valve 13a, and conduit 12a with 14a adapted to extend through the felly of the rim similarly as in Figure 1. The mounting and operation of this tire is effected in the same manner as the tire of Figure 1.

In the illustrations depicted, the longitudinal partitions dividing conduits 9 and 9a into inflating and deflating conduits have been located so as to make the latter conduits of equal volume. It is within the scope and purview of this invention to locate these partitions so as to make the deflating conduits considerably greater in volume than the inflating conduits. Numerous other modifications and alterations of the structure which has been disclosed herein for purposes of illustration will be apparent to one skilled in the art, and it is obvious that the same may be made without departing from the spirit and scope of the invention as defined in the following claims.

We claim:

1. A tubeless tire casing comprising, a plurality of equi-angularly spaced semi-flexible radial diaphragms secured to the inner wall of said casing and dividing said casing into a plurality of compartments, said diaphragms extending radially inwardly to a location radially outwardly of the toes of said tire, a flat rubberized-fabric removable liner concentrically arranged to peripherally engage the ends of said diaphragms and having downwardly turned opposed edges engaging the inner wall of said casing radially inwardly of said diaphragm ends, said liner forming a toroidal space with the inner walls of said casing and a mounting rim, a removable deformable conduit received in said toroidal space, said conduit being inflatable when in place to tightly abut said liner, and the inner wall of said casing and the felly of a mounting rim to provide an air tight seal for each of said compartments, a vertical distensible wall dividing said deformable conduit into an inflating and deflating conduit, a first plurality of one way inflating flap valves in the wall of said inflating conduit which abuts said liner, said liner having a plurality of slots in radial alinement with said inflating valves, whereby air introduced into said inflating conduit flows into each of said compartments, a second plurality of one way deflating flap valves in the wall of said deflating conduit which abuts said liner, said liner having a plurality of slots in radial alinement with said deflating valves whereby air may be withdrawn from each of said compartments, each of said inflating and deflating conduits having inlet and exhaust valves adapted to extend through the felly of a mounting rim.

2. The tire casing of claim 1, wherein said distensible wall is positioned to provide inflating and deflating conduits of equal volume.

3. The tire casing of claim 1, wherein said distensible wall is positioned to provide said deflating conduit with a greater volume than said inflating conduit.

4. A tubeless tire casing comprising, a plurality of equiangularly spaced radial diaphragms secured to the inner wall of said casing and dividing said casing into a plurality of compartments, said diaphragms extending radially inwardly to a location radially outwardly of the toes of said tire, a removable liner concentrically arranged to peripherally engage the ends of said diaphragms, said liner forming a toroidal space with the inner wall of said casing and a mounting rim, a removable deformable conduit received in said toroidal space, said conduit being inflatable when in place to tightly abut said liner, and the inner wall of said casing, and the felly of a mounting rim, to provide an air tight seal for each of said compartments, a distensible wall dividing said deformable conduit into an inflating and a deflating conduit, a first plurality of one way inflating valves in the wall of said inflating conduit which abuts said liner, said liner having a first plurality of slots in radial alinement with said inflating valves, whereby air introduced into said inflating conduit flows into each of said compartments, a second plurality of one way deflating valves in the wall of said deflating conduit which abuts said liner, said liner having a second plurality of slots in radial alinement with said deflating valves, whereby air may be withdrawn from each of said compartments, each of said inflating and deflating conduits having inlet and exhaust valves adapted to extend through the felly of a mounting rim.

5. The tire casing of claim 4, wherein said distensible wall is positioned to provide inflating and deflating conduits of equal volume.

6. The tire casing of claim 4, wherein said distensible wall is positioned to provide said deflating conduit with a greater volume than said inflating conduit.

References Cited in the file of this patent

UNITED STATES PATENTS

| Number | Name | Date |
|---|---|---|
| 1,443,258 | Granat | Jan. 23, 1923 |
| 2,253,230 | Feldman | Aug. 19, 1941 |